(12) United States Patent
Hasenfratz et al.

(10) Patent No.: US 10,344,718 B2
(45) Date of Patent: Jul. 9, 2019

(54) FILTER ELEMENT, IN PARTICULAR FOR GAS FILTRATION

(71) Applicant: Mann+Hummel GMBH, Ludwigsburg (DE)

(72) Inventors: Robert Hasenfratz, Waiblingen (DE); Fabian Wagner, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 498 days.

(21) Appl. No.: 15/130,872

(22) Filed: Apr. 15, 2016

(65) Prior Publication Data

US 2016/0230715 A1    Aug. 11, 2016

Related U.S. Application Data

(63) Continuation of application No. PCT/EP2014/071895, filed on Oct. 13, 2014.

(30) Foreign Application Priority Data

Oct. 15, 2013   (DE) .................. 10 2013 017 034

(51) Int. Cl.
*F02M 35/024* (2006.01)
*B01D 46/00* (2006.01)
*B01D 46/12* (2006.01)
*B01D 46/52* (2006.01)
*F02M 35/02* (2006.01)

(52) U.S. Cl.
CPC ..... *F02M 35/02416* (2013.01); *B01D 46/002* (2013.01); *B01D 46/0005* (2013.01); *B01D 46/12* (2013.01); *B01D 46/521* (2013.01); *F02M 35/0215* (2013.01); *B01D 2265/02* (2013.01); *B01D 2265/025* (2013.01)

(58) Field of Classification Search
CPC .. B01D 46/0005; B01D 46/002; B01D 46/12; B01D 46/521; B01D 2265/02; B01D 2265/025; F02M 35/0215; F02M 35/02416

See application file for complete search history.

(56) References Cited

U.S. PATENT DOCUMENTS 6,312,489 B1    11/2001   Ernst et al.
2009/0188217 A1   7/2009   Amann
(Continued)

FOREIGN PATENT DOCUMENTS

CN    101111297 A    1/2008
DE    202008013309 U1    3/2009
(Continued)

*Primary Examiner* — Robert Clemente
(74) *Attorney, Agent, or Firm* — James Hasselbeck

(57) ABSTRACT

A filter element, including: a first filter media body having a filter media and an inflow side and an outflow side; and a second filter media body having a filter media and an inflow side and an outflow side; wherein the first filter media body and the second filter media body are adapted for installation into a filter element housing shared by both filter media bodies; wherein the filter element has a longitudinal axis; wherein the filter media bodies in the filter element housing delimit a common clean chamber shared by both filter media bodies, the common clean chamber from which the cleaned fluid is to be discharged via at least one outflow aperture; wherein at least one of the filter media bodies is constructed from at least two sections, each section differing in size from other sections.

17 Claims, 4 Drawing Sheets

(56) References Cited

U.S. PATENT DOCUMENTS

| | | |
|---|---|---|
| 2012/0159910 A1 | 6/2012 | Mills et al. |
| 2012/0174788 A1 | 7/2012 | Felber et al. |
| 2014/0000228 A1 | 1/2014 | Enderich et al. |
| 2015/0107201 A1 | 4/2015 | Cornaglia |
| 2016/0082379 A1 | 3/2016 | Gensler et al. |

FOREIGN PATENT DOCUMENTS

| | | |
|---|---|---|
| DE | 102011083657 A1 | 3/2013 |
| DE | 102013206090 A1 | 10/2014 |
| EP | 2135662 A1 | 12/2009 |
| WO | 2013045285 A1 | 4/2013 |
| WO | 2014161933 A1 | 10/2014 |
| WO | 2014177598 A1 | 11/2014 |

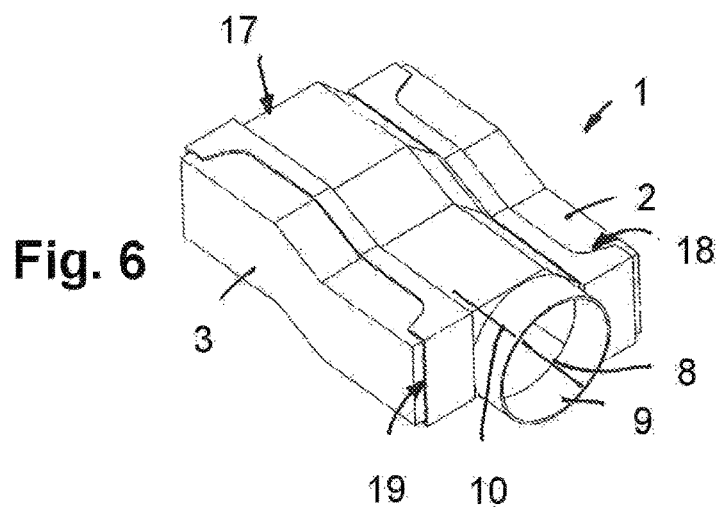
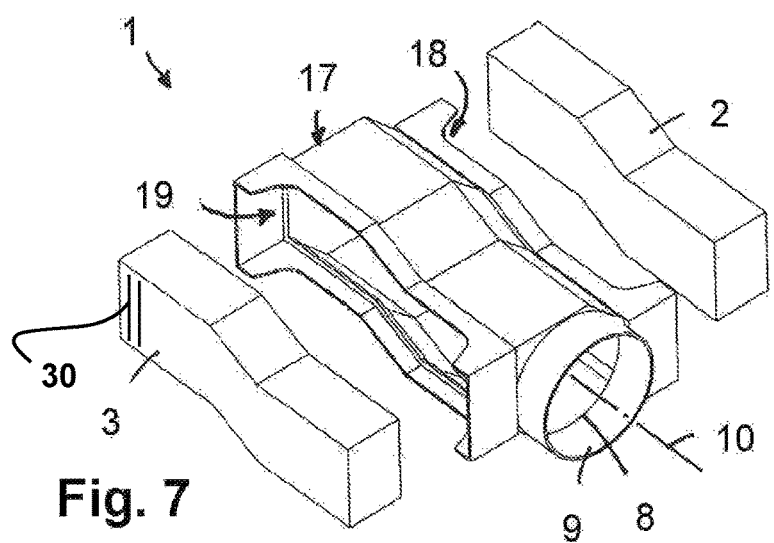
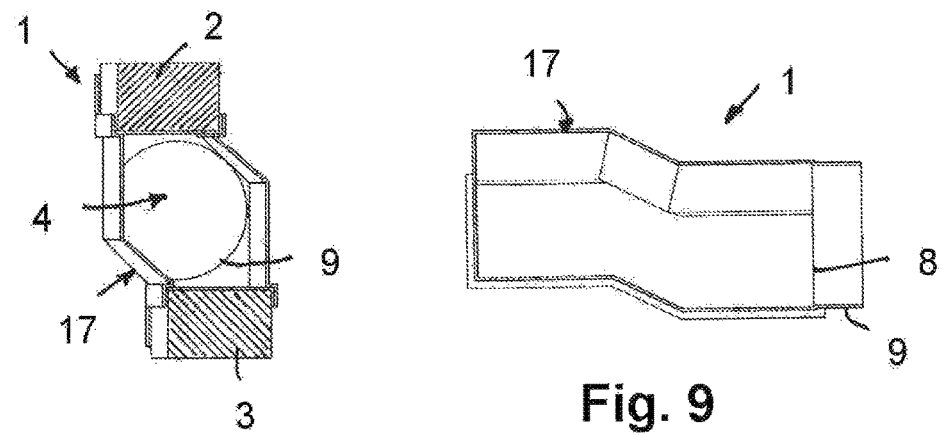

FILTER ELEMENT, IN PARTICULAR FOR GAS FILTRATION

TECHNICAL FIELD

The present invention relates to a filter element, in particular for gas filtration.

BACKGROUND OF THE INVENTION

DE 10 2011 083 657 A1 describes a filter element for a fresh air system in a vehicle. At a carrier body, the filter element has two separately configured filter media bodies implemented as pleated filters, which are disposed diagonally opposite each other at the carrier body and delimit an intermediate clean chamber in the carrier body. The filter media bodies are each through-flown from the outside to the inside by the air to be cleaned; the clean air is discharged from the clean chamber via an outflow aperture in the carrier body.

The carrier body of the filter element is configured as a frame having two parallel running webs, which at their end faces are connected with one end plate respectively. The outflow aperture for discharging the cleaned air from the clean chamber is introduced into one of the end plates. The carrier body is formed as a plastic injection molding component injection-molded onto the two filter media bodies. The injection molding creates a flow-tight connection between the outflow side of each filter media body and the support frame.

The filter media bodies are identically structured and adjoin with their lateral end edges at the end plates of the carrier body. As a result, the filter element overall is approximately cuboidal.

SUMMARY OF THE INVENTION

The object of the present invention is to create a compactly designed filter element having a high filtration performance.

The filter element according to the present invention is preferably used for filtering gas, for example, for filtering the combustion air for an internal combustion engine or for cleaning the fresh air supplied to cabins, for example, vehicle interiors. An application for filtering liquids is, however, also possible.

The filter element includes a first and a second filter media body which are separately configured and each are each implemented as single bodies. The two filter media bodies are inserted into a common filter element housing of the filter element forming a carrier body and delimit a common clean chamber from which the cleaned fluid is discharged via an outflow aperture in the filter element housing.

The two filter media bodies include sections of different sizes, enabling an improved adaptation to differently sized installation spaces and situations. Thus, it is for example possible to insert a corresponding filter element into installation spaces having a non-constant cross section which, in particular, tapers toward one side. The filter media bodies, at which the filtration of the fluid to be cleaned is carried out, include at least one section of reduced dimensions so that the filter element at this point has a respectively smaller dimension and can be fitted into the tapering cross section of the receiving space. Thus, the filter element fills the receiving or installation space to a greater extent, so that smaller and/or difficult-to-access or non-constant cross sections can also be used for filtering the fluid in an efficient manner. Since the filter element has at least two filter media bodies, the filtration area is overall increased.

The sections of different sizes only relate to one filter media body, in addition, optionally also to both filter media bodies or to the relationship between the two filter media bodies. At least one filter media body, optionally both filter media bodies, is/are constructed from at least two sections of different sizes, the at least two sections forming an integral component. For example, the filter media body has two cuboidal sections of different sizes which are connected via a ramp-shaped third section. The two cuboidal sections have, for example, different heights—viewed orthogonally to the flow direction—the ramp-shaped section connecting the higher with the lower section.

One of the sections of a filter media body can also be cut out part-circularly so that an outflow pipe connected to the outflow aperture of the clean chamber can be inserted into the part-circular aperture. This enables to guide the outflow pipe via the filter media body having the part-circular cut-out section. The section having the part-circular cut-out can be located in the center between two cuboidal sections or in the circumferential area of the filter media body.

Additionally or alternatively, for implementing sections of different sizes within one filter media body, embodiments in which the two filter media bodies differ from each other can also come into consideration, irrespective of the geometric implementation of each filter media body. For this purpose, a first filter media body has at least one section which differs in one extension direction from the second filter media body. For example, both filter media bodies are cuboidally formed and have different heights. According to a further exemplary embodiment having cuboidal filter media bodies, said filter media bodies are formed substantially equal in all three extension directions, one filter media body, for example, having a chamfer or a lesser height in one section.

Furthermore, embodiments are possible in which sections different in size or different in shape are provided within one filter media body and, at the same time, differences between the two filter media bodies exist.

Advantageously, the two filter media bodies are each cuboidal or approximately cuboidal and only deviate in a proportionately insignificant manner from the block shape, for example, in a ramp-shaped section or in a part-circular cut-out section.

Insofar as one side of a filter media body has sections different in height, which, for example, are connected via a ramp, the side situated opposite of this filter media body can either be formed in a straight manner or formed without differences in height, or it can, in an alternative embodiment, also have a side area having sections different in height. In the latter case, an embodiment in which the diametrically opposite side areas of a filter media body are identically formed and, thus, have equal height offsets can, for example, also come into consideration.

The filter element housing having the clean chamber included therein can be cuboidally or approximately cuboidally formed. Insofar as gradations are provided in a filter media body, these gradations can also be provided in the filter element housing at the side receiving the respective filter media body. In doing so, depending on the implementation of the filter media bodies, a gradation in the filter element housing possibly results in the longitudinal direction—viewed in the direction of the longitudinal extension of the filter media bodies—and/or in the transverse direction. Such a gradation in the transverse direction can also then be provided if, for equal or also different filter media bodies, a height offset or a lateral offset between the inflow or the clean sides of the filter media bodies is provided at the filter element housing.

The differences between the sections within a filter media body and/or between the two filter media bodies can generally relate to any spatial direction. According to an advantageous embodiment, the sections, however, differ in height—viewed orthogonally to the flow direction of the filter media bodies—whereas the sections in the two further spatial directions can have the same dimensions.

According to a further expedient embodiment, the filter media bodies each have parallel inflow and outflow sides. This is the case for cuboidal or approximately cuboidal filter media bodies; however, a corresponding embodiment having parallel inflow and outflow sides of a filter media body is also possible for other cross-sectional geometries. The inflow and outflow sides are formed, in particular, in a straight manner.

According to a further expedient embodiment, receiving pockets are disposed at the filter element housing, which are used to receive the filter media bodies. The receiving pockets are formed outwardly open so that the filter media bodies can be inserted from the outside into the receiving pockets. The inner contour of the receiving pockets expediently corresponds to the outer contour of the received filter media body so that the receiving pockets are positively received transversely to the flow direction. Optionally, a sealant is introduced into the receiving pockets, via which a flow-tight connection is formed between the inserted filter media bodies and the interior walls of the receiving pockets. The filter media bodies are adhesively bonded to the receiving pockets via the sealant.

The receiving pockets are located either at diametrically opposite sides at the filter element housing or at the same side; however, they are parallel offset or, according to yet a further embodiment, are in an angular position to each other. The outflow sides of the filter media bodies inserted into the receiving pockets either directly adjoin the clean chamber in the filter element housing or are flow-connected to the clean chamber.

Advantageously, the filter media bodies are configured as pleated filters. It can, however, also be expedient to implement the filter media bodies as compact filter blocks made from a filter material.

In the embodiment as pleated filter, the different height of different sections of a filter media body can be formed by different pleat widths. Advantageously, the pleats of the pleated filters or the pleat ridges run at least approximately orthogonal to the longitudinal axis of the filter element and/or to the outflow direction via the outflow aperture in the filter element housing and/or to the center axis of the outflow pipe. The inflow or outflow sides of the pleated filters are spanned by the pleat ridges.

According to a further expedient embodiment, the pleated filters are adhesively bonded at the end edges.

According to an additional expedient embodiment, the first filter media body and the second filter media body are identically constructed. They can be positioned mirror-symmetrically to each other or be offset to each other in one or a plurality of spatial directions and additionally be optionally disposed in a twisted manner. Accordingly, the first and second filter media bodies include a longitudinal, transverse, height and/or angular offset to each other.

The filter media bodies are received into the filter element housing, the receiving area having, for example, in an outwardly open receiving pocket at the filter element housing preferably at least one straight edge surrounding the inflow or the outflow side of a filter media body.

The outflow aperture in the filter element housing, via which the cleaned fluid is discharged from the clean chamber, can be disposed in different locations of the filter element housing. For example, the axis of the outflow aperture is situated at least approximately coaxially or parallel to the longitudinal axis of the filter element extending parallel to the longitudinal extension of the filter media bodies. It is also possible to assign the outflow aperture in such a manner that the axis of the outflow aperture is arranged at least approximately perpendicular to the longitudinal axis or, according to yet a further embodiment, is arranged, with reference to the longitudinal axis of the filter element, in different angular positions between a parallel and a perpendicular alignment.

The filter element housing can be implemented as an integrally formed injection molding component or as a multi-piece housing component composed of individual plastic parts.

The filter element having the at least two filter media bodies forms a filter insert part which is insertable into a filter housing of a filter device.

BRIEF DESCRIPTION OF THE DRAWINGS

Further advantages and expedient embodiments may be concluded from the further claims, the description of the figures, and the drawings.

FIG. 6 shows a further variant embodiment of a filter element in a perspective view, having stepped filter media bodies which are arranged offset in height to each other;

FIG. 7 shows the filter element according to FIG. 6 in an explosion view;

FIG. 8 shows a section transversely through the filter element according to FIG. 6 or 7;

FIG. 9 shows a section laterally through the filter element according to FIG. 6 or 7;

In the figures, the same components are provided with the same reference characters.

DESCRIPTION OF THE INVENTION

Figure 1:
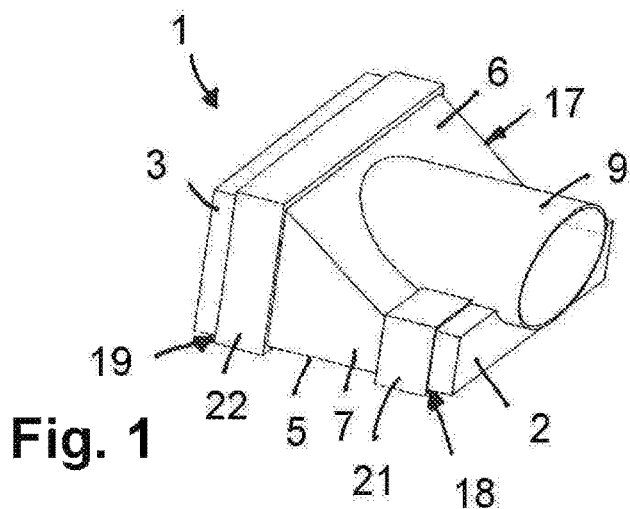
FIG. 1 shows a perspective view of a filter element having two cuboidal, separately configured filter media bodies and a filter element housing as a carrier body, the filter element housing including two diametrically opposite, outwardly open receiving pockets for the filter media bodies.
Figure 2:
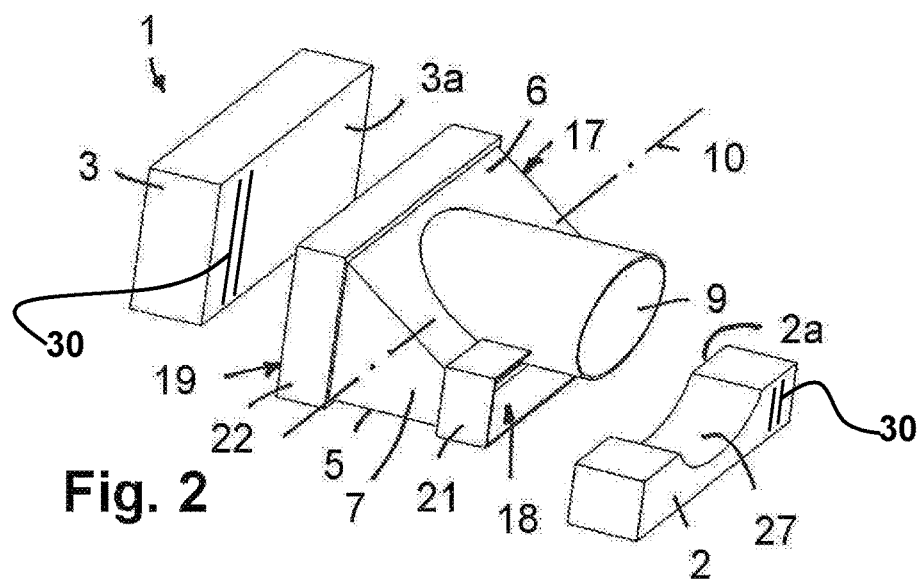
FIG. 2 shows the filter element according to FIG. 1 in an explosion view.
Figure 3:
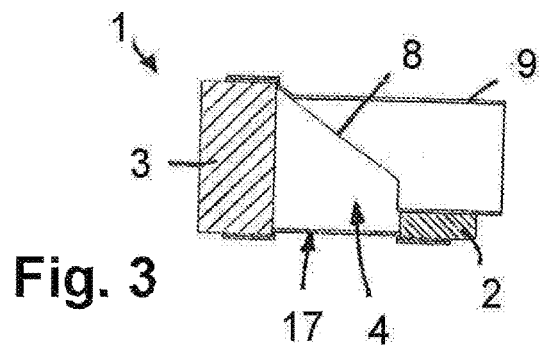
FIG. 3 shows the filter element in a sectional view transverse to the longitudinal extension of the filter element or the filter media bodies.

FIGS. 1 through 3 show a first exemplary embodiment of a filter element 1 which can be used for gas filtration. Filter element 1 includes two filter media bodies 2 and 3 at diametrically opposite sides of a filter element housing 17 forming a carrier body for filter media bodies 2, 3. At filter element housing 17, which has a bottom part 5, a cover part 6 and a side part 7, which enclose a clean chamber 4 for receiving the cleaned fluid, external receiving pockets 18 and 19 having surrounding walls 21 or 22 for receiving filter media bodies 2 and 3 are formed. Receiving pockets 18 and 19 are formed outwardly open so that filter media bodies 2, 3 can be inserted from the outside into receiving pockets 18, 19. In the fully installed position, outflow sides 2a or 3a adjoin filter media bodies 2, 3 directly at clean chamber 4 in filter element housing 17.

Moreover, an outflow aperture 8 is introduced into filter element housing 17, to which an outflow pipe 9 integrally formed with filter element housing 17 is connected. With reference to longitudinal axis 10 of filter element 1, which extends parallel to the longitudinal extension of cuboidal filter media bodies 2, 3, outflow pipe 9 runs in the transverse direction and simultaneously orthogonally to the inflow and outflow sides of filter media bodies 2, 3.

Two cuboidal filter media bodies 2, 3 are formed different in size. Filter media body 3 is significantly higher than additional filter media body 2, the height extending perpendicularly to the flow direction. The further dimensions in flow direction and in the longitudinal direction are equal for both filter media bodies 2, 3.

Additionally, the lower filter media body 2 has a part-circular recess 27 at the top side, at which cuboidal sections of the filter media body respectively connect in the longitudinal direction. Part-circular recess 27 in filter media body 2 is used to receive outflow pipe 9, having the advantage that, despite a proportionately large diameter, outflow pipe 9 does not project over the height of the top side of filter element 1 so that the height of filter element 1 is overall defined by larger filter media body 3.

Figure 4:
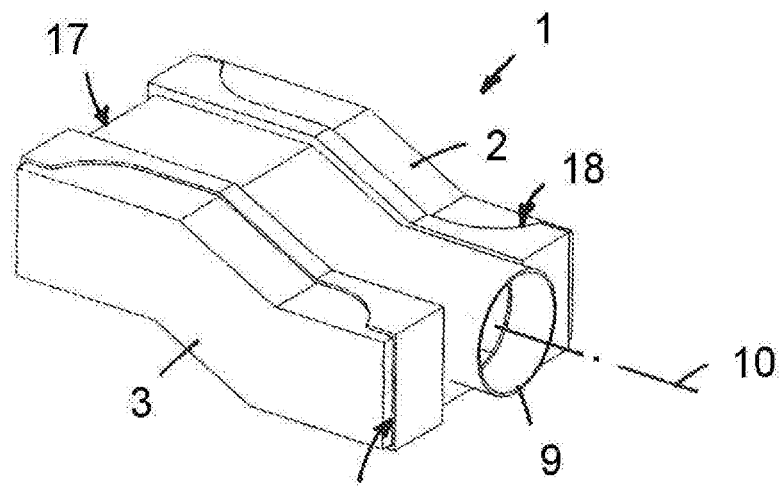
FIG. 4 shows a filter element in a variant embodiment having stepped filter media bodies.

In FIG. 4, filter element 1 has two filter media bodies 2, 3 which each are formed equal in size. Each filter media body 2, 3 has three sections connecting to one another in the longitudinal direction, of which the two external sections are each cuboidally formed and the center, connecting section is formed in the shape of a ramp. Filter media bodies 2, 3 are equally formed at its bottom side and at its top side and have respectively one step corresponding with the ramp-shaped section.

Outflow pipe 9 at filter element housing 17 is situated between two filter media bodies 2, 3; the axis of outflow pipe 9 runs coaxially or parallel to longitudinal axis 10 of filter element 1, longitudinal axis 10 being situated parallel to the longitudinal extension of filter media bodies 2, 3.

Figure 5:
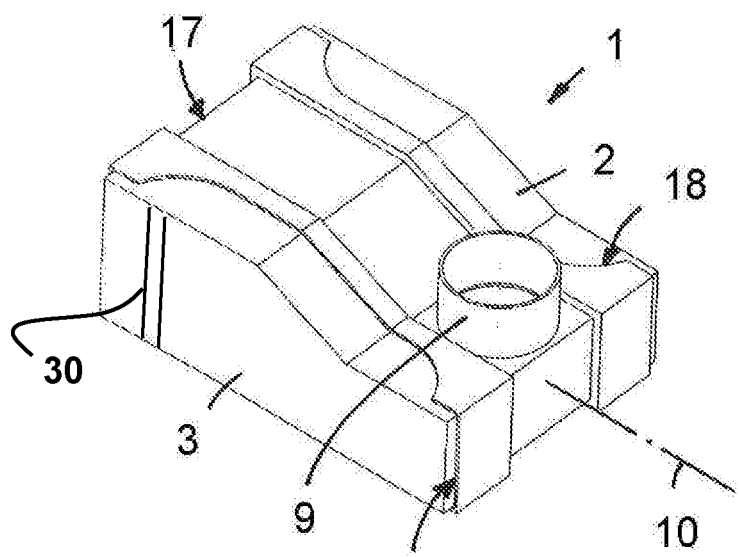
FIG. 5 shows a further variant embodiment of a filter element having stepped filter media bodies, the bottom sides of which are formed in a straight manner.

In the exemplary embodiment according to FIG. 5, both filter media bodies 2, 3 are, similar to FIG. 4, provided with three sections of which the two sections situated on the outside are cuboidally formed having different heights and the center, connecting section is implemented in a ramp-shaped manner. In contrast to FIG. 4, however, in FIG. 5, only the top side of filter media bodies 2, 3 is implemented in a stepped manner, whereas the bottom side is formed in a straight manner.

In FIG. 5, outflow pipe 9 connecting at the outflow aperture in filter element housing 17, moreover, extends orthogonally to longitudinal axis 10 of filter element 1 and is located at the top side of filter element housing 17 in the area between filter media bodies 2, 3.

FIGS. 6 through 9 show a further exemplary embodiment for a filter element 1, filter media bodi[es] 2, [3] of which are, at diametrically opposite sides of filter element housing 17, equally constructed, such as in the exemplary embodiment according to FIG. 4. Two filter media bodies 2, 3 are formed equal in size and are composed of two external cuboidal sections and a center, connecting ramp-shaped section. The top side and the bottom side of filter media bodies 2, 3 each are implemented in a stepped manner.

Two filter media bodies 2, 3 are, however, received in an offset manner into receiving pockets 18, 19 at filter element housing 17. In contrast to filter media body 3, filter media body 2 is disposed downwardly offset, as a result of which a corresponding offset results also in filter element housing 17. For this reason, filter element housing 17, together with the gradation in filter media bodies 2, 3, is implemented in a stepped manner in the direction of longitudinal axis 10 as well as in the transverse direction hereto—parallel to the flow direction of the filter media bodies.

Outflow pipe 9 is located at the end face of filter element housing 17 between filter media bodies 2, 3, the axis of outflow pipe 9 being arranged parallel or coaxially to longitudinal axis 10.

Figure 10:
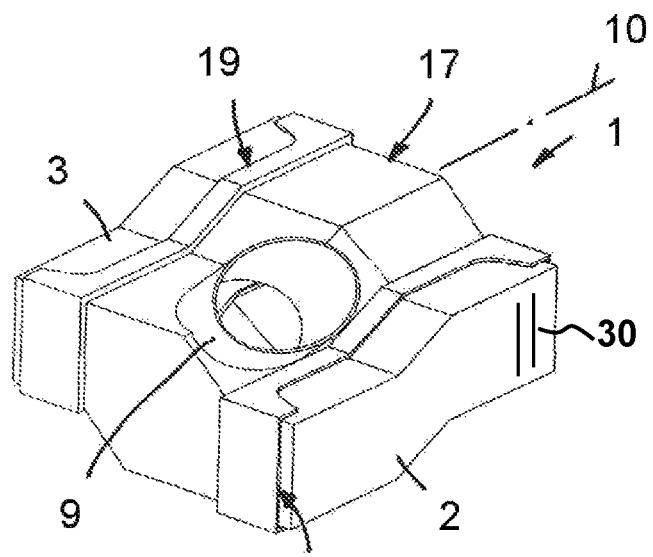
FIG. 10 shows, in a further variant embodiment, a filter element having an outflow pipe at the filter element housing obliquely aligned.
Figure 11:
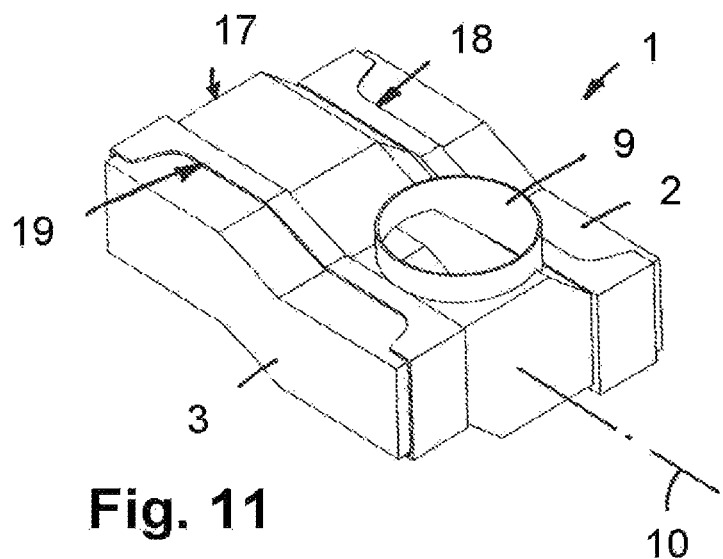
FIG. 11 shows a further exemplary embodiment of a filter element having an outflow pipe extending perpendicular to the longitudinal axis.

The exemplary embodiments according to FIGS. 10 and 11 largely correspond to that according to FIGS. 6 through 9 having two identically constructed filter media bodies 2, 3 which are implemented in a stepped manner and feature a height offset to each other at filter element housing 17. Accordingly, filter element housing 17 is also formed in a stepped manner in the direction of longitudinal axis 10, as well as also in the transverse direction.

According to FIG. 10, outflow pipe 9 is disposed in an oblique position at filter element housing 17 and extends in the direction of filter media body 2 downwardly offset. The axis of outflow pipe 9 is situated orthogonally to longitudinal axis 10 of filter element 1 and, at the same time, at an angle of approximately 45° to the direction of flow through filter media bodies 2, 3. The outflow aperture and outflow pipe 9 extend over the step inserted into filter element housing 17.

In the exemplary embodiment according to FIG. 11, outflow pipe 9 is disposed at the top side of filter element housing 17, the axis of outflow pipe 9 extending orthogonally to longitudinal axis 10 and, moreover, orthogonally to the direction of flow through filter media bodies 2 and 3.

In some figures, pleat ridges 30 of filter media bodies 2, 3 implemented as pleated filters are indicated in an exemplary manner.

What is claimed is:
1. A filter element, comprising:
a first filter media body having a filter media and an inflow side and an outflow side; and
a second filter media body having a filter media and an inflow side and an outflow side;
wherein the first filter media body and the second filter media body are adapted for installation into a filter element housing shared by both filter media bodies;
wherein the filter element has a longitudinal axis;
wherein the filter media bodies in the filter element housing delimit a common clean chamber shared by both filter media bodies, the common clean chamber from which a cleaned fluid is to be discharged via at least one outflow aperture;
wherein at least one of the filter media bodies is constructed from at least two sections, each section differing in size from other sections;
wherein the sections differ in height orthogonal to flow direction of the filter media bodies.

2. The filter element according to claim 1, wherein the first and/or second filter media body comprises two cuboidal sections of different sizes, which are connected via a ramp-shaped section.

3. The filter element according to claim 1, wherein the first and/or second filter media body comprises two cuboidal sections between which a part-circular cut-out section is situated.

4. The filter element according to claim 1, wherein the first filter media body has at least one section which differs in size from the second filter media body.

5. The filter element according to claim 4, wherein all sections of the first filter media body in one expansion direction are smaller in size than similarly arranged sections of the second filter media body.

6. The filter element according to claim 1, wherein the outflow aperture has a central axis;
wherein the axis of the outflow aperture is disposed at least approximately coaxially or parallel to a longitudinal axis of the filter element.

7. The filter element according to claim 1, wherein the outflow aperture has a central axis;
wherein the axis of the outflow aperture is disposed at least approximately perpendicular to the longitudinal axis of the filter element.

8. The filter element according to claim 1, wherein the first filter media body and the second filter media body each are received into an outwardly open receiving pocket at the filter element housing.

9. The filter element according to claim 1, wherein the filter media of the filter media bodies are configured as pleated filters having pleated filter media;
wherein the sections of the filter media body have a different height, wherein the different heights of the sections of the filter media body is formed by different pleat widths.

10. The filter element according to claim 9, wherein the pleated filters are adhesively bonded at end edges.

11. The filter element according to claim 1, wherein the first filter media body and the second filter media body are substantially identical.

12. The filter element according to claim 1, wherein at least one edge in the filter element housing, which surrounds the inflow or the outflow side of a filter media body, is not formed in a straight manner.

13. The filter element according to claim 1, wherein the first filter media body is offset in at least one of: longitudinally, transversely, in height and/or an angular offset relative to the second filter media body.

14. The filter element according to claim 1, wherein the filter element housing is formed as a one-piece integrally formed plastic injection molding component.

15. A filter element, comprising:
a first filter media body having a filter media and an inflow side and an outflow side; and
a second filter media body having a filter media and an inflow side and an outflow side;
wherein the first filter media body and the second filter media body are adapted for installation into a filter element housing shared by both filter media bodies;
wherein the filter element has a longitudinal axis;
wherein the filter media bodies in the filter element housing delimit a common clean chamber shared by both filter media bodies, the common clean chamber from which a cleaned fluid is to be discharged via at least one outflow aperture;
wherein at least one of the filter media bodies is constructed from at least two sections, each section differing in size from other sections;
wherein the filter medium bodies have parallel inflow and outflow sides.

16. The filter element according to claim 15, wherein the first filter media body and the second filter media body each are received into an outwardly open receiving pocket at the filter element housing.

17. A filter device comprising:
a filter element including:
a first filter media body having a filter media and an inflow side and an outflow side; and
a second filter media body having a filter media and an inflow side and an outflow side;
wherein the first filter media body and the second filter media body are adapted for installation into a filter element housing shared by both filter media bodies;
wherein the filter element has a longitudinal axis;
wherein the filter media bodies in the filter element housing delimit a common clean chamber shared by both filter media bodies, the common clean chamber from which a cleaned fluid is to be discharged via at least one outflow aperture; and
wherein at least one of the filter media bodies is constructed from at least two sections, each section differing in size from other sections;
wherein the sections differ in height orthogonal to flow direction of the filter media bodies; and
a filter housing into which the filter element is received.

* * * * *